United States Patent [19]

Ishii et al.

[11] 3,894,047
[45] July 8, 1975

[54] PROCESS FOR THE PREPARATION OF 1,3,6-TRIOXOCANE

[75] Inventors: Takami Ishii, Chiba; Naohisa Takikawa; Katsumi Furukawa, both of Ube, all of Japan

[73] Assignee: Ube Industries, Ltd., Ube, Japan

[22] Filed: Dec. 3, 1973

[21] Appl. No.: 421,482

[30] Foreign Application Priority Data
Dec. 5, 1972   Japan.............................. 47-121211

[52] U.S. Cl. ............................................. 260/338
[51] Int. Cl.² ...................................... C07D 323/00
[58] Field of Search .................................... 260/338

[56] References Cited
UNITED STATES PATENTS
2,350,350   6/1944   Gresham............................ 260/338
FOREIGN PATENTS OR APPLICATIONS
394,679   6/1933   United Kingdom................. 260/338
393,608   5/1933   United Kingdom................. 260/338

OTHER PUBLICATIONS
Melvin J. Astle et al., Industrial & Engineering Chemistry, Vol. 46 (1954) pp. 787–791.

Pierre A. Laurent et al., Rev. port. quim., Vol. 2 (1959) pp. 17–28.

*Primary Examiner*—Norma S. Milestone
*Attorney, Agent, or Firm*—Waters, Schwartz & Nissen

[57] ABSTRACT

1,3,6-trioxocane is prepared in a high yield by the process wherein an oligomer consisting of condensed formaldehyde and diethylene glycol is prepared in the presence of a catalytic compound selected from the group consisting of inorganic acids, acid salts of inorganic acids, alkali metal salts of persulfuric acid and organic sulfonic acids by reacting diethylene glycol with a substance capable of releasing formaldehyde therefrom under the reaction condition, the resulting oligomer is cyclized to 1,3,6-trioxocane by heating it at a temperature of 150° to 250°C under a normal or reduced pressure in the presence of a catalytic compound selected from the group consisting of alkali metal salts of persulfuric acids, ferrous sulfate and ferric sulfate and, then, the resulting 1,3,6-trioxocane is isolated by way of distillation.

7 Claims, No Drawings

PROCESS FOR THE PREPARATION OF 1,3,6-TRIOXOCANE

The present invention relates to a process for the preparation of 1,3,6-trioxocane. A process for the preparation of 1,3,6-trioxocane was disclosed in "Industrial and Engineering Chemistry", Vol. 46, pages 787–791. In such process, diethylene glycol reacts with paraformaldehyde in the presence of a cation-exchange resin while removing water produced in the above reaction system. By such reaction, an oligomer made of the diethylene glycol and formaldehyde which is derived from the paraformaldehyde is obtained. The oligomer is separated from the cation-exchange resin. The separated oligomer is heated in the absence of catalyst to produce the 1,3,6-trioxocane. The 1,3,6-trioxocane is isolated by way of distillation.

However, the above-mentioned process has disadvantages of low yield and low formation rate of the 1,3,6-trioxocane. Therefore, the process cannot provide a production of 1,3,6-trioxocane at high efficiency.

An object of the present invention is to provide a process for the preparation of 1,3,6-trioxocane with a high yield and formation rate.

The above object can be accomplished by the process of the present invention, which comprises preparing an oligomer consisting of condensed diethylene glycol and formaldehyde by reacting diethylene glycol with a substance capable of releasing formaldehyde therefrom under the reaction condition in the presence of a catalyst selected from the group consisting of inorganic acids, acid salts of inorganic acids, alkali metal salts of persulfuric acid and organic sulfonic acids, while removing water produced in the above reaction, heating the oligomer at a temperature of at least 150°C under a normal or reduced pressure to convert the oligomer to 1,3,6-trioxocane, and isolating the resulting 1,3,6-trioxocane by way of distillation.

In the process of the present invention, the substance capable of releasing formaldehyde under the reaction condition, may be selected from gaseous formaldehyde, aqueous solution of formaldehyde, paraformaldehyde, α-polyoxymethylene, polyacetal.

The diethylene glycol usable for the process of the present invention may be of a commercial grade.

It is desirable that the formaldehyde-releasing substance and diethylene glycol contain as little water as possible.

Since the oligomer forming reaction is a reversible reaction, it is indispensable in order to accelerate the oligomer formation that water which has been generated by the reaction of the diethylene glycol with formaldehyde is removed from the reaction system. When the reaction materials contain a relatively large amount of water, the removal of the water results in loss of heat and simultaneously, a portion of the formaldehyde in the reaction system is undesirably distilled by accompanying the removal of the water.

In the preparation of the oligomer, it is preferable that the diethylene glycol is used in an amount of 0.5 to 2 mole, more preferably about 1 mole with respect to 1 mole of formaldehyde to be supplied from the formaldehyde-releasing substance. When the ratio by mole of the diethylene glycol to the formaldehyde is less than 0.5, a large amount of unreacted formaldehyde is removed from the reaction system. This results in a undesirable consumption of a large amount of formaldehyde. On the other hand, if the ratio by mole of the diethylene glycol to the formaldehyde is larger than 2, the formation rate and yield of the 1,3,6-trioxocane become lower. This results in an economical disadvantage.

In the preparation of the oligomer, the catalyst may be selected from the group consisting of inorganic acids, for example, sulfuric acid, sulfurous acid, phosphoric acid; acid salts of an inorganic acid, for example, sodium hydrogen sulfate, potassium hydrogen sulfate, lead (II) sulfate, ferrous sulfate, ferric sulfate, aluminium sulfate, cupric sulfate, manganese (II) sulfate, magnesium sulfate, zinc sulfate, cobalt (II) sulfate, nickel (II) sulfate, tin (II) sulfate, chromium (II) sulfate, calcium sulfate, zinc chloride, iron trichloride, tin tetrachloride, copper dichloride, aluminium nitrate; alkali metal salts of persulfuric acid, for instance, sodium persulfate, potassium persulfate and mixtures thereof, and; organic sulfonic acids, for instance, toluene sulfonic acid, benzene sulfonic acid, alkylbenzene sulfonic acids, cation-exchange resins having sulfonic acid radicals. Particularly, sulfuric acid, sodium persulfate, and potassium persulfate are preferably usable for the preparation of the oligomer.

Preferably, the catalyst for the preparation of the oligomer is used in an amount of 0.02 to 5%, more preferably, 0.2 to 2% based on the weight of diethylene glycol to be condensed.

As stated above, since the oligomer formation reaction is reversible, it is necessary in order to promote the oligomer formation, to successively remove the water produced by the condensation of diethylene glycol with formaldehyde.

The oligomer formation does not always require the use of the reaction medium. However, the use of the reaction medium is effective for preventing the runaway of the formaldehyde from the reaction system. Accordingly, in general, the reaction medium is used for the preparation of the oligomer. The reaction medium may be selected from aromatic hydrocarbons, for example, benzene, toluene and xylenes; aliphatic hydrocarbons, for example, n-hexane and n-heptane, and; alicyclic hydrocarbons, for instance, cyclohexane and cycloheptane. Preferably, the reaction medium is selected from compounds capable of forming an azeotropic mixture with water, for example, benzene, toluene and n-heptane.

The reaction medium is preferably used in an amount of 30 to 200 ml, preferably, 60 to 150 ml with respect to 1000 g of a total weight of the diethylene glycol and the formaldehyde releasing substance. If the reaction medium is used in an amount less than the above lower limit, the runaway of the formaldehyde during the reaction undesirably increases. If the reaction medium is used in an amount larger than the above-mentioned upper limit, a large amount of formaldehyde is accompanied by the reaction medium which is distilled and removed from the reaction system during the oligomer formation. In any case, a large amount of formaldehyde is undesirably removed from the reaction system.

The preparation of the oligomer is carried out at a temperature higher than the boiling point of water or the azeotropic mixture of the reaction medium and water, in general, with refluxing. In the preparation operation, the evaporated vapors are cooled to condense them and the condensed water is separated from the condensed reaction medium. The condensed reaction medium is recycled to the reaction system. The operation is continued until the evaporated vapor substantially contains no water.

After the oligomer formation is completed, the reaction medium and unreacted formaldehyde are distilled from the reaction system. The distillation residue is the oligomer. The oligomer is subjected to a cyclization reaction to prepare 1,3,6-trioxocane.

In the event that the inorganic acid or organic sulfonic acid is used as a catalyst for the preparation of the oligomer, the residual acid in the oligomer is neutralized by a basic compound such as sodium hydroxide, sodium carbonate and ammonia and, thereafter, the neutralized oligomer is supplied to the cyclization step. Since the cyclization of the oligomer cannot be effected in the presence of the basic compound, it should be noted that in the neutralization of the oligomer mixture, the basic compound should be used in the same gram equivalent as that of the acid in the oligomer. The neutralization product has no influence on the cyclization of the oligomer. However, in the case where after the resultant 1,3,6-trioxocane is isolated from the reaction mixture, the residue is utilized as a diethylene glycol supply source for the oligomer formation step, it is desirable that the neutralization product is separated from the oligomer by way of filtration.

In the case where the alkali metal salt of perfulfuric acid is used as the catalyst for the oligomer formation, the resultant oligomer which has been isolated by distilling off the reaction medium after the reaction is completed, may be subjected to the cyclization step without separation of the catalyst therefrom.

In the process of the present invention, the oligomer prepared in the above-mentioned step is heated at a temperature of 150° to 250°C, preferably 155° to 200°C under a normal or reduced pressure, in the presence of a catalyst selected from the group consisting of alkali metal salts of persulfuric acid, ferrous sulfate and ferric sulfate. The resultant 1,3,6-trioxocane is distilled during the above heating and collected by cooling.

The alkali metal salt of persulfuric acid may be sodium persulfate, potassium persulfate or their mixtures.

In the preparation of 1,3,6-trioxocane, the catalyst, alkali metal salts of persulfuric acid or ferrous or ferric sulfate, may be present in an amount of 0.01 to 2%, preferably, 0.05 to 1% based on the weight of the oligomer. If the catalyst is used in an amount less than 0.01%, the yield and formation rate of the 1,3,6-trioxocane is too low. Even if the amount of the catalyst becomes larger than 1%, the yield of the 1,3,6-trioxocane does not increase. The formation of 1,3,6-trioxocane can be effected under a normal pressure or a reduced pressure. However, in order to promote the distillation of the resulting 1,3,6-trioxocane, it is preferable that the 1,3,6-trioxocane formation step is carried out under a reduced pressure, preferably, of 5 to 100 mmHg.

The 1,3,6-trioxocane is useful as a crease and shrink proofing agent for cellulose fiber fabrics. Also, the 1,3,6-trioxocane is useful as a material for preparing polyacetal resin. The following examples are merely illustrative of the process of the present invention.

EXAMPLES 1 through 3

A 2 litre three-neck flask provided with a receiver having a measuring scale for condensed water, a reflux cooling condenser fitted on a top part of the receiver and a stirrer, was charged with 1,378 g of diethylene glycol. The diethylene glycol was mixed, with stirring, with 390 g of α-polyoxymethylene having a degree of polymerization of 100 in the form of powder, 200 ml of n-heptane and 1.3 ml of sulfuric acid of a concentration of 98% by weight. Thereafter, a thermometer was fitted to the flask. The reaction mixture in the flask was heated and maintained at a temperature of 85° to 90°C to azeotropically distil water and n-heptane. The distillated vapors were condensed in the cooling condenser and conduced to the receiver. In the receiver, the condensed water was separated from the n-heptane phase. The remaining n-neptane was recycled into the reaction mixture contained in the flask. The above operations were continued for about 4 hours until the distilled vapors contained no water. Thereafter, the n-heptane was distilled and removed from the remaining reaction mixture which contained the aimed oligomer of formaldehyde and ethyleneglycol. The above oligomer mixture was mixed with 2.6 g of sodium carbonate to neutralize the sulfuric acid therein. The neutralized oligomer mixture was air-cooled for 20 minutes, and filtered through a glass filter of 2G4 grade to separate a mixture of sodium carbonate and sodium sulfate which was not dissolved in the oligomer, from the oligomer. The oligomer in an amount of 1529 g was obtained.

In Example 1, 0.72 g of potassium persulfate were mixed with 457 g of the oligomer prepared above. The mixture was charged into a 1 litre Claisen flask and heated and maintained at a temperature of 150° to 160°C under an absolute pressure of 30 mmHg to distil 1,3,6-trioxocane. During the distillation, first, the portion distilled at a temperature of 65°C or lower was removed and, then all the portion distilled at a temperature higher than 65°C was collected. The collected portion consisted of 1,3,6-trioxocane having a purity of 99% by weight.

Formation rate of the 1,3,6-trioxocane was determined by the method mentioned below.

A first distillation for the substance having a boiling point of 65°C or lower was followed by a second distillation for 1,3,6-trioxocane at a temperature higher than 65°C. The quantity of the 1,3,6-trioxocane distilled in first one hour of the second distillation was measured. An average quantity of the distilled 1,3,6-trioxocane per minute was calculated from the above-measured quantity. The formation rate of 1,3,6-trioxocane is represented by the average quantity of the distilled 1,3,6-trioxocane per minute as calculated above.

In Example 2, the same procedures as in Example 1 were repeated except that in the formation of 1,3,6-trioxocane from the oligomer, 1.43 g of potassium persulfate were used.

In Example 3, the same procedures as in Example 1 were repeated except that 2.85 g of potassium persulfate were used for the formation of 1,3,6-trioxocane.

Table 1 shows the amounts in grams and yield in % of the collected 1,3,6-trioxocane and the formation rates of 1,3,6-trioxocane in Examples 1, 2 and 3.

Table 1

| Example | Amount of potassium persulfate (g) | 1,3,6-trioxocane Formation rate (ml/min) | Yield gram | Yield (%) |
|---|---|---|---|---|
| 1 | 0.72 | 3.74 | 350 | 76.3 |
| 2 | 1.43 | 6.07 | 399 | 86.9 |
| 3 | 2.85 | 3.96 | 373 | 81.5 |

COMPARISON EXAMPLE

The same procedures as in Example 1 were repeated using no potassium persulfate for the formation of 1,3,6-trioxocane. 207 g of 1,3,6-trioxocane having a purity of 99% by weight were obtained. The yield was 45.2%. The formation rate was 0.47 ml/min.

That is, in the formation of 1,3,6-trioxocane, the use of no potassium persulfate as the catalyst results in a remarkably low yield and formation rate of 1,3,6-trioxocane.

EXAMPLES 4 through 6

The same procedures as in Example 1 were repeated 3 times using ferric sulfate in amounts of 0.72 g (Example 4); 1.43 g (Example 5) and 4.30 g (Example 6) instead of the potassium persulfate. The results are indicated in Table 2. The resultant 1,3,6-trioxocane were of a purity of 99% by weight.

Table 2

| Example | Amount of ferric sulfate (g) | 1,3,6-trioxocane Formation rate (ml/min) | Yield gram | Yield (%) |
|---|---|---|---|---|
| 4 | 0.72 | 2.82 | 352 | 76.8 |
| 5 | 1.43 | 2.70 | 350 | 76.3 |
| 6 | 4.30 | 2.24 | 352 | 76.8 |

EXAMPLE 7

The same flask as used in Example 1 was charged with 1,378 g of diethylene glycol. The diethylene glycol was mixed, with stirring, with 390 g of α-polyoxymethylene in form of powder, 200 ml of n-heptane and 4.69 g of potassium persulfate. The reaction mixture was subjected to the formation of the oligomer using the same method as in Example 1 for 7.5 hours. After n-heptane was distilled and removed, 1,519 g of the oligomer were obtained.

The oligomer thus prepared was subjected to the formation of 1,3,6-trioxocane using the same method as in Example 2 except that no cyclization catalyst was used. That is, 457 g of the oligomer were converted to 392 g of 1,3,6-trioxocane having a purity of 99% by weight. The yield was 84.9%. The formation rate was 3.14 ml/min.

EXAMPLE 8

The same procedures as in Example 7 were repeated using 4.69 g of sodium persulfate as a catalyst for the formation of the oligomer instead of the potassium persulfate. 320 g of 1,3,6-trioxocane of 99% by weight purity were obtained. The yield was 69.3%. The formation rate of 1,3,6-trioxocane was 4.16 ml/min.

EXAMPLE 9

The same procedures as in Example 1 were repeated for the preparation of the oligomer, using, instead of sulfuric acid, 163 g of Amberlyst 15 (trade mark of a $SO_3H$ type ion-exchange resin made by Rohm and Hass). By the separation of the Amberlyst 15 from the reaction mixture by filtrating, 1,520 g of the oligomer were obtained.

In order to prepare 1,3,6-trioxocane from the above-prepared oligomer, the same procedures as in Example 1 were repeated using 4.76 g of potassium persulfate. 1,334 g of 1,3,6-trioxocane having a purity of 99% by weight was obtained at a formation rate of 3.16 ml/min. The yield was 87.0%.

What we claim is:

1. In a process for the preparation of 1,3,6-trioxocane comprising reacting diethylene glycol with a substance capable of releasing formaldehyde therefrom under the reaction conditions in the presence of a catalyst selected from the group consisting of inorganic acids, acid salts of inorganic acids, alkali metal salts of persulfuric acid and organic sulfonic acids while removing water produced by the condensation of the diethylene glycol and formaldehyde, to prepare an oligomer consisting of condensed diethylene glycol and formaldehyde, cyclizing the oligomer to 1,3,6-trioxocane, and isolating the resultant 1,3,6-trioxocane from the reaction mixture by distillation, the improvement comprising heating the oligomer to cyclize it to 1,3,6-trioxocane, in the presence of a catalyst selected from the group consisting of alkali metal salts of persulfuric acid, ferrous sulfate and ferric sulfate at a temperature of 150° to 250°C under a normal or reduced pressure while distilling the resultant 1,3,6-trioxocane to isolate it from the reaction mixture.

2. A process as claimed in claim 1, wherein said alkali metal salt of the persulfuric acid to be used for the cyclization of the oligomer is potassium persulfate.

3. A process as claimed in claim 1, wherein said catalyst for the cyclization is present in an amount of 0.01 to 2% based on the weight of the oligomer.

4. A process as claimed in claim 3, wherein said amount of the catalyst is in a range from 0.05 to 1% based on the weight of the oligomer.

5. A process as claimed in claim 1, wherein said heating temperature of the oligomer is in a range from 155° to 200°C.

6. A process as claimed in claim 1, wherein said substance capable of releasing formaldehyde therefrom is selected from the group consisting of gaseous formaldehyde, aqueous solution of formaldehyde, paraformaldehyde, α-polyoxymethylene, and polyacetal.

7. A process as claimed in claim 1, wherein said diethylene glycol is present in an amount of 0.5 to 2 mole with respect to 1 mole of formaldehyde.

* * * * *